US011524918B2

(12) United States Patent
Korwin-Edson

(10) Patent No.: US 11,524,918 B2
(45) Date of Patent: *Dec. 13, 2022

(54) HIGH PERFORMANCE FIBERGLASS COMPOSITION WITH IMPROVED SPECIFIC MODULUS

(71) Applicant: Owens Corning Intellectual Capital, LLC, Toledo, OH (US)

(72) Inventor: Michelle L. Korwin-Edson, Granville, OH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/686,333

(22) Filed: Nov. 18, 2019

(65) Prior Publication Data

US 2020/0165158 A1 May 28, 2020

Related U.S. Application Data

(60) Provisional application No. 62/771,245, filed on Nov. 26, 2018.

(51) Int. Cl.
| | |
|---|---|
| *C03C 13/00* | (2006.01) |
| *C03B 37/02* | (2006.01) |
| *C03C 3/085* | (2006.01) |
| *C03C 3/087* | (2006.01) |
| *C03C 3/095* | (2006.01) |
| *C03C 3/097* | (2006.01) |
| *C08J 5/04* | (2006.01) |

(52) U.S. Cl.
CPC .............. *C03C 13/00* (2013.01); *C03B 37/02* (2013.01); *C03C 3/085* (2013.01); *C03C 3/087* (2013.01); *C03C 3/095* (2013.01); *C03C 3/097* (2013.01); *C08J 5/043* (2013.01); *C03C 2213/00* (2013.01)

(58) Field of Classification Search
CPC ......... C03C 13/00; C03C 3/085; C03C 3/087; C03C 3/095; C03C 3/097; C03C 2213/00; C03B 37/02; C03B 37/022; C08J 5/043; C08J 5/08; C08J 2300/22; C08J 2300/24
See application file for complete search history.

(56) References Cited

U.S. PATENT DOCUMENTS

| | | |
|---|---|---|
| 5,281,562 A | 1/1994 | Araujo et al. |
| 5,320,986 A | 6/1994 | Taniguchi et al. |
| 5,334,558 A | 8/1994 | Dietz et al. |
| 5,336,644 A | 8/1994 | Akhtar et al. |
| 5,340,778 A | 8/1994 | Kloss et al. |
| 5,350,972 A | 9/1994 | Bucher et al. |
| 5,372,977 A | 12/1994 | Mazon-Ramos et al. |
| 5,422,755 A | 6/1995 | Morgan |
| 5,424,255 A | 6/1995 | Kassner |
| 5,472,471 A | 12/1995 | Baba et al. |
| 5,491,767 A | 2/1996 | McPherson et al. |
| 5,548,353 A | 8/1996 | Kassner |
| 5,569,630 A | 10/1996 | Landa et al. |
| 5,641,347 A | 6/1997 | Grabowski et al. |
| 5,648,302 A | 7/1997 | Brow et al. |
| 5,665,660 A | 9/1997 | Yamawaki et al. |
| 5,674,789 A | 10/1997 | Anquetil |
| 5,698,019 A | 12/1997 | Frank et al. |
| 5,698,482 A | 12/1997 | Frank et al. |
| 5,747,395 A | 5/1998 | Smith et al. |
| 5,830,812 A | 11/1998 | Shelestak et al. |
| 5,837,629 A | 11/1998 | Combes et al. |
| 5,849,649 A | 12/1998 | Poole |
| 5,902,665 A | 5/1999 | Kuroda |
| 5,919,718 A | 7/1999 | Hirota et al. |
| 5,968,857 A | 10/1999 | Pinckney |
| 5,998,037 A | 12/1999 | Sridharan et al. |
| 6,010,787 A | 1/2000 | Yamaguchi et al. |
| 6,043,171 A | 3/2000 | Siebers et al. |
| 6,066,273 A | 5/2000 | Yamaguchi et al. |
| 6,074,969 A | 6/2000 | Naumann et al. |
| 6,114,264 A | 9/2000 | Krumwiede et al. |
| 6,118,216 A | 9/2000 | Marlor |
| 6,132,843 A | 10/2000 | Kuroda et al. |
| 6,133,179 A | 10/2000 | Berthereau |
| 6,147,019 A | 11/2000 | Donohue |
| 6,162,749 A | 12/2000 | Brocheton et al. |
| 6,235,667 B1 | 5/2001 | Paloschi et al. |
| 6,255,239 B1 | 7/2001 | Sakoske |
| 6,287,993 B1 | 9/2001 | Fu et al. |
| 6,297,181 B1 | 10/2001 | Kunert et al. |
| 6,323,585 B1 | 11/2001 | Crane et al. |
| 6,329,310 B1 | 12/2001 | Peuchert et al. |

(Continued)

FOREIGN PATENT DOCUMENTS

| | | |
|---|---|---|
| CN | 1152836 C | 6/2004 |
| CN | 1171817 C | 10/2004 |
| CN | 101792267 A | 8/2010 |
| CN | 102557461 A | 7/2012 |
| CN | 101580344 B | 10/2012 |
| CN | 102786223 A | 11/2012 |
| CN | 101092308 B | 2/2013 |
| CN | 103086605 A | 5/2013 |
| CN | 103172267 A | 6/2013 |
| CN | 103492331 A | 1/2014 |

(Continued)

OTHER PUBLICATIONS

International Search Report and Written Opinion from PCT/US2019/061923 dated Mar. 3, 2020.

(Continued)

*Primary Examiner* — Robert S Jones, Jr.
(74) *Attorney, Agent, or Firm* — Calfee, Halter & Griswold LLP

(57) ABSTRACT

Glass fibers formed from the inventive composition may be used in applications that require high stiffness and have a specific modulus between 34 and 40 MJ/kg. Such applications include woven fabrics for use in forming wind turbine blades and aerospace structures.

19 Claims, No Drawings

(56) References Cited

U.S. PATENT DOCUMENTS

| | | |
|---|---|---|
| 6,333,287 B1 | 12/2001 | Seto |
| 6,333,288 B1 | 12/2001 | Clement et al. |
| 6,335,299 B1 | 1/2002 | Foguenne et al. |
| 6,399,527 B1 | 6/2002 | Kishimoto et al. |
| 6,451,720 B1 | 9/2002 | Kishimoto et al. |
| 6,458,730 B1 | 10/2002 | Nagata et al. |
| 6,461,734 B1 | 10/2002 | Carre |
| 6,461,736 B1 | 10/2002 | Nagashima et al. |
| 6,476,975 B1 | 11/2002 | Yoshii et al. |
| 6,511,932 B2 | 1/2003 | Yamaguchi et al. |
| 6,518,211 B1 | 2/2003 | Bradshaw et al. |
| 6,524,685 B1 | 2/2003 | Torr et al. |
| 6,524,982 B1 | 2/2003 | Nagata et al. |
| 6,548,434 B2 | 4/2003 | Nagashima |
| 6,596,659 B1 | 7/2003 | Nagata et al. |
| 6,610,620 B1 | 8/2003 | Nagata et al. |
| 6,610,621 B2 | 8/2003 | Masuko |
| 6,611,372 B1 | 8/2003 | Peyghambarian et al. |
| 6,623,845 B1 | 9/2003 | Katsumura et al. |
| 6,627,569 B1 | 9/2003 | Naumann et al. |
| 6,630,420 B1 | 10/2003 | Naumann et al. |
| 6,632,758 B2 | 10/2003 | Beall et al. |
| 6,635,591 B2 | 10/2003 | Nagata et al. |
| 6,642,161 B2 | 11/2003 | Nagata et al. |
| 6,642,162 B2 | 11/2003 | Nagata et al. |
| 6,645,888 B2 | 11/2003 | Nagata et al. |
| 6,645,889 B2 | 11/2003 | Nagata et al. |
| 6,645,890 B2 | 11/2003 | Nagata et al. |
| 6,645,891 B2 | 11/2003 | Nagata et al. |
| 6,645,892 B2 | 11/2003 | Nagata et al. |
| 6,645,894 B2 | 11/2003 | Endo |
| 6,649,549 B2 | 11/2003 | Nagata et al. |
| 6,667,259 B2 | 12/2003 | Clasen et al. |
| 6,677,046 B2 | 1/2004 | Hachitani et al. |
| 6,713,419 B1 | 3/2004 | Onozawa et al. |
| 6,716,780 B2 | 4/2004 | Landa et al. |
| 6,753,279 B2 | 6/2004 | Kohli |
| 6,753,280 B2 | 6/2004 | Seto et al. |
| 6,764,972 B2 | 7/2004 | Yoshii et al. |
| 6,764,973 B2 | 7/2004 | Berthereau et al. |
| 6,777,358 B2 | 8/2004 | Snowdon et al. |
| 6,816,235 B2 | 11/2004 | Kido et al. |
| 6,831,030 B2 | 12/2004 | Koyama et al. |
| 6,841,493 B2 | 1/2005 | Cho et al. |
| 6,844,278 B2 | 1/2005 | Wang et al. |
| 6,859,606 B2 | 2/2005 | Jiang et al. |
| 6,912,093 B2 | 6/2005 | Endo |
| 6,924,245 B2 | 8/2005 | Sakamoto |
| 6,936,556 B2 | 8/2005 | Sridharan et al. |
| 6,939,820 B2 | 9/2005 | Numaguchi et al. |
| 6,992,030 B2 | 1/2006 | Paulson |
| 6,992,031 B2 | 1/2006 | Naumann et al. |
| 6,995,101 B2 | 2/2006 | Zou et al. |
| 7,008,892 B2 | 3/2006 | Bourova et al. |
| 7,115,536 B2 | 10/2006 | Hayden et al. |
| 7,141,524 B2 | 11/2006 | Wolff et al. |
| 7,144,834 B2 | 12/2006 | Clasen et al. |
| 7,189,672 B2 | 3/2007 | Aitken et al. |
| 7,192,898 B2 | 3/2007 | Mori et al. |
| 7,211,957 B2 | 5/2007 | Bergmann et al. |
| 7,250,383 B2 | 7/2007 | Inoue et al. |
| 7,291,571 B2 | 11/2007 | Sprenger et al. |
| 7,323,426 B2 | 1/2008 | Aitken |
| 7,323,427 B2 | 1/2008 | Wolff et al. |
| 7,341,964 B2 | 3/2008 | Emlemdi |
| 7,341,966 B2 | 3/2008 | Marques |
| 7,371,703 B2 | 5/2008 | Masumura et al. |
| 7,375,043 B2 | 5/2008 | Fechner et al. |
| 7,396,785 B2 | 7/2008 | Takada et al. |
| 7,396,788 B2 | 7/2008 | Kawai et al. |
| 7,407,902 B2 | 8/2008 | Hasegawa et al. |
| 7,425,518 B2 | 9/2008 | Koshida et al. |
| 7,435,695 B2 | 10/2008 | Hormadaly |
| 7,435,696 B2 | 10/2008 | Scheffler-Hudlet et al. |
| 7,449,419 B2 | 11/2008 | Li |
| 7,456,121 B2 | 11/2008 | Comte |
| 7,465,686 B2 | 12/2008 | Comte |
| 7,470,640 B2 | 12/2008 | Badding et al. |
| 7,473,660 B2 | 1/2009 | Comte |
| 7,476,633 B2 | 1/2009 | Comte et al. |
| 7,493,008 B2 | 2/2009 | Barbosa et al. |
| 7,497,093 B2 | 3/2009 | Rosenflanz |
| 7,498,731 B2 | 3/2009 | Fechner et al. |
| 7,501,366 B2 | 3/2009 | Wolff et al. |
| 7,501,369 B2 | 3/2009 | Tachiwana |
| 7,504,350 B2 | 3/2009 | Coster et al. |
| 7,507,681 B2 | 3/2009 | Aitken et al. |
| 7,515,332 B2 | 4/2009 | Tsuda |
| 7,515,802 B2 | 4/2009 | Peuchert et al. |
| 7,517,822 B2 | 4/2009 | Fechner et al. |
| 7,521,387 B2 | 4/2009 | Xue et al. |
| 7,528,083 B2 | 5/2009 | Shimizu et al. |
| 7,528,084 B2 | 5/2009 | Emlemdi |
| 7,531,474 B2 | 5/2009 | Shiraishi |
| 7,531,475 B2 | 5/2009 | Kishimoto et al. |
| 7,553,785 B2 | 6/2009 | Ritter et al. |
| 7,560,404 B2 | 7/2009 | Shelestak et al. |
| 7,576,021 B2 | 8/2009 | Miyauchi et al. |
| 7,585,798 B2 | 9/2009 | Yoshida et al. |
| 7,598,192 B2 | 10/2009 | Wolff et al. |
| 7,605,099 B2 | 10/2009 | Wolff et al. |
| 7,618,909 B2 | 11/2009 | Fujiwara et al. |
| 7,629,279 B2 | 12/2009 | Tanaka et al. |
| 7,632,767 B2 | 12/2009 | Nagashima et al. |
| 7,635,521 B2 | 12/2009 | Aitken et al. |
| 7,638,448 B2 | 12/2009 | Wolff et al. |
| 7,659,222 B2 | 2/2010 | Shimizu |
| 7,670,973 B2 | 3/2010 | Ritter et al. |
| 7,670,977 B2 | 3/2010 | Teyssedre et al. |
| 7,677,059 B2 | 3/2010 | Mori et al. |
| 7,682,999 B2 | 3/2010 | Teyssedre |
| 7,687,417 B2 | 3/2010 | Hang et al. |
| 7,687,418 B2 | 3/2010 | Peuchert et al. |
| 7,687,419 B2 | 3/2010 | Kawai |
| 7,691,763 B2 | 4/2010 | Arbab et al. |
| 7,700,869 B2 | 4/2010 | Thomsen et al. |
| 7,700,870 B2 | 4/2010 | Thomsen et al. |
| 7,709,406 B2 | 5/2010 | Cornelius et al. |
| 7,745,361 B2 | 6/2010 | Kasuga et al. |
| 7,820,575 B2 | 10/2010 | Nagashima et al. |
| 7,825,051 B2 | 11/2010 | Smith et al. |
| 7,858,546 B2 | 12/2010 | Miyauchi et al. |
| 7,863,207 B2 | 1/2011 | Son et al. |
| 7,884,041 B2 | 2/2011 | Uehara |
| 7,892,995 B2 | 2/2011 | Castillo |
| 7,897,531 B2 | 3/2011 | Ishioka |
| 7,897,532 B2 | 3/2011 | Onoda et al. |
| 7,897,533 B2 | 3/2011 | Onoda et al. |
| 7,927,705 B2 | 4/2011 | Bayya |
| 7,964,523 B2 | 6/2011 | Mayumi et al. |
| 8,004,196 B2 | 8/2011 | Fechner et al. |
| 8,017,537 B2 | 9/2011 | Seto et al. |
| 8,096,147 B2 | 1/2012 | Flemming et al. |
| 8,097,077 B2 | 1/2012 | Steidl |
| 8,110,513 B2 | 2/2012 | Ueda et al. |
| 8,133,828 B2 | 3/2012 | Denry et al. |
| 8,143,179 B2 | 3/2012 | Aitken et al. |
| 8,156,763 B2 | 4/2012 | Nagashima et al. |
| 8,168,551 B2 | 5/2012 | Iizawa et al. |
| 8,168,553 B2 | 5/2012 | Wolff et al. |
| 8,168,693 B2 | 5/2012 | Ritter et al. |
| 8,178,454 B2 | 5/2012 | Morisada |
| 8,178,595 B2 | 5/2012 | Ritter et al. |
| 8,187,715 B2 | 5/2012 | Danielson et al. |
| 8,193,108 B2 | 6/2012 | Inoue et al. |
| 8,198,201 B2 | 6/2012 | Comte et al. |
| 8,203,169 B2 | 6/2012 | Matsumoto et al. |
| 8,247,336 B2 | 8/2012 | Onoda |
| 8,268,065 B2 | 9/2012 | Ritter et al. |
| 8,268,739 B2 | 9/2012 | Ritter et al. |
| 8,288,298 B2 | 10/2012 | Mayumi et al. |
| 8,298,972 B2 | 10/2012 | Fulton et al. |
| 8,304,358 B2 | 11/2012 | Shelestak et al. |
| 8,309,481 B2 | 11/2012 | Morisada |

(56) References Cited

U.S. PATENT DOCUMENTS

| | | |
|---|---|---|
| 8,318,054 B2 | 11/2012 | Cid-Aguilar et al. |
| 8,318,619 B2 | 11/2012 | Comte et al. |
| 8,336,332 B2 | 12/2012 | Hayashi et al. |
| 8,338,321 B2 | 12/2012 | Morisada |
| 8,346,029 B2 | 1/2013 | Jiang |
| 8,349,751 B2 | 1/2013 | Nagai et al. |
| 8,361,915 B2 | 1/2013 | Cid-Aguilar et al. |
| 8,361,917 B2 | 1/2013 | Li et al. |
| 8,367,573 B2 | 2/2013 | Naito et al. |
| 8,372,768 B2 | 2/2013 | Morisada |
| 8,389,428 B2 | 3/2013 | Wada et al. |
| 8,404,606 B2 | 3/2013 | Wolff et al. |
| 8,424,344 B2 | 4/2013 | Zou et al. |
| 8,431,502 B2 | 4/2013 | Dejneka et al. |
| 8,445,394 B2 | 5/2013 | Aitken et al. |
| 8,470,723 B2 | 6/2013 | Naito et al. |
| 8,476,178 B2 | 7/2013 | Zou et al. |
| 8,486,850 B2 | 7/2013 | Li et al. |
| 8,507,394 B2 | 8/2013 | Shimizu |
| 8,526,475 B2 | 9/2013 | Li et al. |
| 8,536,078 B2 | 9/2013 | Ritzberger et al. |
| 8,541,327 B1 | 9/2013 | Lu et al. |
| 8,557,150 B2 | 10/2013 | Ritzberger et al. |
| 8,598,056 B2 | 12/2013 | Ellison et al. |
| 8,670,182 B2 | 3/2014 | Tanida et al. |
| 8,697,589 B2 | 4/2014 | Matano et al. |
| 8,759,237 B2 | 6/2014 | Ritzberger et al. |
| 8,759,239 B2 | 6/2014 | Comte et al. |
| 8,763,429 B2 | 7/2014 | Danielson et al. |
| 8,765,619 B2 | 7/2014 | Brunet et al. |
| 8,766,524 B2 | 7/2014 | Kohara et al. |
| 8,778,075 B2 | 7/2014 | Ritzberger et al. |
| 8,805,133 B1 | 8/2014 | Rhonehouse et al. |
| 8,828,897 B2 | 9/2014 | Fechner et al. |
| 8,835,334 B2 | 9/2014 | Matano et al. |
| 8,858,745 B2 | 10/2014 | Sun et al. |
| 8,895,460 B2 | 11/2014 | Fachizono et al. |
| 8,906,506 B2 | 12/2014 | Shibata et al. |
| 8,951,925 B2 | 2/2015 | George et al. |
| 8,956,987 B2 | 2/2015 | Durschang et al. |
| 8,999,871 B2 | 4/2015 | Mushiake et al. |
| 9,006,120 B2 | 4/2015 | George et al. |
| 9,048,056 B2 | 6/2015 | Yoshimura et al. |
| 9,051,207 B2 | 6/2015 | Han et al. |
| 9,051,209 B2 | 6/2015 | Melscoët-Chauvel et al. |
| 9,051,210 B2 | 6/2015 | Melscoët-Chauvel et al. |
| 9,079,794 B2 | 7/2015 | Horsley |
| 9,096,460 B2 | 8/2015 | Brix et al. |
| 9,118,166 B2 | 8/2015 | George et al. |
| 9,120,695 B2 | 9/2015 | Lee et al. |
| 9,120,699 B2 | 9/2015 | Nakane et al. |
| 9,145,331 B2 | 9/2015 | Takayama |
| 9,156,725 B2 | 10/2015 | Dejneka et al. |
| 9,156,729 B2 | 10/2015 | McGinnis et al. |
| 9,206,074 B2 | 12/2015 | Yanase et al. |
| 9,230,872 B2 | 1/2016 | Hashimoto |
| 9,249,048 B2 | 2/2016 | Ritzberger et al. |
| 9,255,028 B2 | 2/2016 | Negishi et al. |
| 9,260,342 B2 | 2/2016 | Borczuch-Laczka et al. |
| 9,278,883 B2 | 3/2016 | Li et al. |
| 9,290,413 B2 | 3/2016 | Dejneka et al. |
| 9,309,144 B2 | 4/2016 | Nonnet et al. |
| 9,321,674 B2 | 4/2016 | Ritzberger et al. |
| 9,376,339 B2 | 6/2016 | Tezuka |
| 9,388,069 B2 | 7/2016 | Schreder et al. |
| 9,394,194 B2 | 7/2016 | Negishi |
| 9,399,000 B2 | 7/2016 | Ahn et al. |
| 9,409,814 B2 | 8/2016 | Takayama |
| 9,409,816 B2 | 8/2016 | Kim et al. |
| 9,428,417 B2 | 8/2016 | Yanase et al. |
| 9,434,637 B2 | 9/2016 | Aniya |
| 9,458,053 B2 | 10/2016 | Nakane et al. |
| 9,522,842 B2 | 12/2016 | Nonnet et al. |
| 9,556,061 B2 | 1/2017 | Naito et al. |
| 9,573,841 B1 | 2/2017 | Cid-Aguilar et al. |
| 9,581,760 B2 | 2/2017 | Jiang et al. |
| 9,593,040 B2 | 3/2017 | Comte et al. |
| 9,604,874 B2 | 3/2017 | Beall et al. |
| 9,617,182 B2 | 4/2017 | Cho et al. |
| 9,650,286 B2 | 5/2017 | Comte et al. |
| 9,658,437 B2 | 5/2017 | Goodwin et al. |
| 9,670,089 B2 | 6/2017 | Yanase et al. |
| 9,670,090 B2 | 6/2017 | Naito et al. |
| 9,701,570 B2 | 7/2017 | Mauro et al. |
| 9,701,573 B2 | 7/2017 | Beall et al. |
| 9,714,190 B2 | 7/2017 | Schilm et al. |
| 9,758,423 B2 | 9/2017 | Cao et al. |
| 9,809,488 B2 | 11/2017 | Beall et al. |
| 9,834,472 B2 | 12/2017 | Gabel et al. |
| 9,850,163 B2 | 12/2017 | Beall et al. |
| 9,871,176 B2 | 1/2018 | Maloney et al. |
| 9,911,969 B2 | 3/2018 | Afyon et al. |
| 9,926,223 B2 | 3/2018 | Kim et al. |
| 9,944,551 B2 | 4/2018 | Li |
| 9,957,191 B2 | 5/2018 | Li et al. |
| 9,963,378 B2 | 5/2018 | Yamamoto |
| 9,988,297 B2 | 6/2018 | Kim et al. |
| 9,991,011 B2 | 6/2018 | Kim et al. |
| 10,011,519 B2 | 7/2018 | Himei et al. |
| 10,035,727 B2 | 7/2018 | Li et al. |
| 10,071,933 B2 | 9/2018 | Wang et al. |
| 10,155,686 B2 | 12/2018 | Cao et al. |
| 10,160,685 B2 | 12/2018 | Comte et al. |
| 10,207,949 B2 | 2/2019 | Zhang et al. |
| 10,239,781 B2 | 3/2019 | Zhang et al. |
| 10,294,142 B2 | 5/2019 | Zhang et al. |
| 10,351,465 B2 | 7/2019 | Cao et al. |
| 10,377,662 B2 | 8/2019 | Zhang |
| 10,399,889 B2 | 9/2019 | Zhang et al. |
| 10,414,688 B2 | 9/2019 | Rampf et al. |
| 10,479,721 B2 | 11/2019 | Li |
| 2002/0197049 A1 | 12/2002 | Baniel et al. |
| 2003/0045421 A1 | 3/2003 | Burger et al. |
| 2004/0127342 A1 | 7/2004 | Liang et al. |
| 2004/0235636 A1 | 11/2004 | Tsai et al. |
| 2006/0033983 A1 | 2/2006 | Dai et al. |
| 2006/0204763 A1 | 9/2006 | Hartman et al. |
| 2007/0032365 A1 | 2/2007 | Varga et al. |
| 2007/0099787 A1 | 5/2007 | Hayden et al. |
| 2007/0158317 A1 | 7/2007 | Brix et al. |
| 2008/0068703 A1 | 3/2008 | Nakatsuka et al. |
| 2008/0153068 A1 | 6/2008 | Kessler et al. |
| 2009/0088309 A1 | 4/2009 | Niida et al. |
| 2009/0105061 A1 | 4/2009 | Fujiwara et al. |
| 2009/0131239 A1 | 5/2009 | Kotake et al. |
| 2009/0286058 A1 | 11/2009 | Shibata et al. |
| 2011/0003678 A1 | 1/2011 | Hofmann et al. |
| 2011/0133118 A1 | 6/2011 | Honma et al. |
| 2011/0236684 A1 | 9/2011 | Teschner et al. |
| 2012/0163987 A1 | 6/2012 | Hausrath et al. |
| 2012/0183785 A1 | 7/2012 | Schirrmeister et al. |
| 2013/0017387 A1 | 1/2013 | James, III et al. |
| 2013/0161569 A1 | 6/2013 | Ishihara |
| 2013/0288876 A1 | 10/2013 | Fujisawa et al. |
| 2013/0316162 A1 | 11/2013 | Murata et al. |
| 2014/0106168 A1 | 4/2014 | Ritter et al. |
| 2014/0145122 A1 | 5/2014 | Sawai et al. |
| 2015/0307389 A1 | 10/2015 | He et al. |
| 2015/0337106 A1 | 11/2015 | Kajihara et al. |
| 2015/0368151 A1 | 12/2015 | Kuwatani et al. |
| 2016/0068428 A1 | 3/2016 | Li et al. |
| 2016/0096768 A1 | 4/2016 | Takao et al. |
| 2016/0102010 A1 | 4/2016 | Beall et al. |
| 2016/0176752 A1 | 6/2016 | Gabel et al. |
| 2016/0236972 A1 | 8/2016 | Kiczenski et al. |
| 2016/0304391 A1 | 10/2016 | Eberhardt et al. |
| 2016/0326045 A1 | 11/2016 | Li |
| 2017/0057865 A1 | 3/2017 | Kim et al. |
| 2017/0183255 A1 | 6/2017 | Walther et al. |
| 2017/0217828 A1 | 8/2017 | George et al. |
| 2017/0327409 A1 | 11/2017 | Seto |
| 2017/0342383 A1 | 11/2017 | Deng et al. |
| 2018/0016183 A1 | 1/2018 | Bowden et al. |
| 2018/0029926 A1 | 2/2018 | Sato et al. |

(56) References Cited

U.S. PATENT DOCUMENTS

| | | |
|---|---|---|
| 2018/0037491 A1 | 2/2018 | Hijiya et al. |
| 2018/0050953 A1 | 2/2018 | Inaba et al. |
| 2018/0079679 A1 | 3/2018 | Kass |
| 2018/0086661 A1 | 3/2018 | Zhang et al. |
| 2018/0099895 A1 | 4/2018 | Horsley et al. |
| 2018/0099896 A1 | 4/2018 | Horsley et al. |
| 2018/0099897 A1 | 4/2018 | Horsley et al. |
| 2018/0099901 A1 | 4/2018 | Beally et al. |
| 2018/0118606 A1 | 5/2018 | Lambricht et al. |
| 2018/0118607 A1 | 5/2018 | Horsley et al. |
| 2018/0118608 A1 | 5/2018 | Zhang et al. |
| 2018/0118611 A1 | 5/2018 | Cao et al. |
| 2018/0127305 A1 | 5/2018 | Li |
| 2018/0127306 A1 | 5/2018 | Li et al. |
| 2018/0147114 A1 | 5/2018 | DeMartino et al. |
| 2018/0170798 A1 | 6/2018 | Aitken |
| 2018/0179103 A1 | 6/2018 | Zhang et al. |
| 2018/0179104 A1 | 6/2018 | Zhang et al. |
| 2018/0186685 A1 | 7/2018 | Murayama et al. |
| 2018/0186688 A1 | 7/2018 | Zhang et al. |
| 2018/0194673 A1 | 7/2018 | Liebald et al. |
| 2018/0208497 A1 | 7/2018 | Zhang et al. |
| 2018/0208498 A1 | 7/2018 | Li et al. |
| 2018/0222788 A1 | 8/2018 | Akada et al. |
| 2018/0222789 A1 | 8/2018 | Maeda et al. |
| 2018/0257973 A1 | 9/2018 | Kim et al. |
| 2018/0282204 A1 | 10/2018 | Rampf et al. |
| 2019/0077699 A1 | 3/2019 | Zhang et al. |
| 2019/0100453 A1 | 4/2019 | Zhang et al. |
| 2019/0169066 A1 | 6/2019 | Zhang et al. |
| 2019/0177210 A1 | 6/2019 | Beall et al. |
| 2019/0256407 A1 | 8/2019 | Beall et al. |
| 2019/0322571 A1 | 10/2019 | Aitken |

FOREIGN PATENT DOCUMENTS

| | | |
|---|---|---|
| CN | 102849958 B | 4/2015 |
| CN | 104478223 A | 4/2015 |
| CN | 104529173 A | 4/2015 |
| CN | 104556709 A | 4/2015 |
| CN | 103172265 B | 10/2015 |
| CN | 104973790 A | 10/2015 |
| CN | 104973791 A | 10/2015 |
| CN | 104973792 A | 10/2015 |
| CN | 103601371 B | 5/2016 |
| CN | 106007369 A | 10/2016 |
| CN | 107382052 A | 11/2017 |
| CN | 105517966 B | 12/2017 |
| CN | 104829130 B | 1/2018 |
| CN | 107935381 A | 4/2018 |
| EP | 552932 A1 | 7/1993 |
| EP | 560555 A2 | 9/1993 |
| EP | 997445 B1 | 3/2004 |
| EP | 1398303 B1 | 11/2015 |
| EP | 2942342 A1 | 11/2015 |
| EP | 2601148 B1 | 4/2018 |
| EP | 3321237 A1 | 5/2018 |
| EP | 3372568 A1 | 9/2018 |
| JP | 2011105554 A | 6/2011 |
| WO | 2012001654 A2 | 1/2012 |
| WO | 2012001656 A2 | 1/2012 |
| WO | 2014062715 A1 | 4/2014 |
| WO | 2015009686 A1 | 1/2015 |
| WO | 2016183133 A1 | 11/2016 |
| WO | 2017180811 A1 | 10/2017 |
| WO | 2017192794 A1 | 11/2017 |
| WO | 2018015740 A1 | 1/2018 |

OTHER PUBLICATIONS

International Search Report and Written Opinion from PCT/US2019/061917 dated Sep. 1, 2020.

Office Action from CN Application No. 201911171826.3 dated Sep. 23, 2022.

HIGH PERFORMANCE FIBERGLASS COMPOSITION WITH IMPROVED SPECIFIC MODULUS

RELATED APPLICATIONS

This application claims priority to U.S. Provisional Application No. 62/771,245, filed on Nov. 26, 2018, titled HIGH PERFORMANCE FIBERGLASS COMPOSITION WITH IMPROVED SPECIFIC MODULUS, the entire disclosure of which is incorporated herein by reference.

BACKGROUND OF THE INVENTION

Glass fibers are manufactured from various raw materials combined in specific proportions to yield a desired composition, commonly termed a "glass batch." This glass batch may be melted in a melting apparatus and the molten glass is drawn into filaments through a bushing or orifice plate (the resultant filaments are also referred to as continuous glass fibers). A sizing composition containing lubricants, coupling agents and film-forming binder resins may then be applied to the filaments. After the sizing is applied, the fibers may be gathered into one or more strands and wound into a package or, alternatively, the fibers may be chopped while wet and collected. The collected chopped strands may then be dried and cured to form dry chopped fibers or they can be packaged in their wet condition as wet chopped fibers.

The composition of the glass batch, along with the fiberglass manufactured therefrom, is often expressed in terms of the oxides contained therein, which commonly include $SiO_2$, $Al_2O_3$, CaO, MgO, $B_2O_3$, $Na_2O$, $K_2O$, $Fe_2O_3$, $TiO_2$, $Li_2O$, and the like. Numerous types of glasses may be produced from varying the amounts of these oxides, or eliminating some of the oxides in the glass batch. Examples of such glasses that may be produced include R-glass, E-glass, S-glass, A-glass, C-glass, and ECR-glass. The glass composition controls the forming and product properties of the glass. Other characteristics of glass compositions include the raw material cost and environmental impact.

For instance, E-glass is an aluminoborosilicate glass, generally alkali-free, and commonly used in electrical applications. One advantage of E-Glass is that its liquidus temperature allows operating temperatures for producing glass fibers to be approximately 1900° F. to 2400° F. (1038° C. to 1316° C.). The ASTM classification for E-glass fiber yarns used in printed circuit boards and aerospace applications defines the composition to be 52 to 56 weight % $SiO_2$, 16 to 25 weight % CaO, 12 to 16 weight % $Al_2O_3$, 5 to 10 weight % $B_2O_3$, 0 to 5 weight % MgO, 0 to 2 weight % $Na_2O$ and $K_2O$, 0 to 0.8 weight % $TiO_2$, 0.05 to 0.4 weight % $Fe_2O_3$ and 0 to 1.0 weight % Fluorine.

Boron-free fibers are sold under the trademark ADVANTEX® (Owens Corning, Toledo, Ohio, USA). Boron-Free fibers, such as are disclosed in U.S. Pat. No. 5,789,329, incorporated herein by reference in its entirety, offer a significant improvement in operating temperatures over boron-containing E-glass. Boron-Free glass fibers fall under the ASTM definition for E-glass fibers for use in general-use applications.

R-Glass is a family of glasses that are composed primarily of the oxides of silicon, aluminum, magnesium, and calcium with a chemical composition that produces glass fibers with a higher mechanical strength than E-Glass fibers. R-Glass has a composition that contains about 58 to about 60% by weight $SiO_2$, about 23.5 to about 25.5% by weight $Al_2O_3$, about 14 to about 17% by weight CaO plus MgO, and less than about 2% by weight of miscellaneous components. R-Glass contains more alumina and silica than E-Glass and requires higher melting and processing temperatures during fiber forming. Typically, the melting and processing temperatures for R-Glass are higher than those for E-Glass. This increase in processing temperature requires the use of a high-cost platinum-lined melter. In addition, the close proximity of the liquidus temperature to the forming temperature in R-Glass requires that the glass be fiberized at a viscosity lower than E-Glass, which is customarily fiberized at or near about 1000 poise. Fiberizing R-Glass at the customary 1000 poise viscosity would likely result in glass devitrification, which causes process interruptions and reduced productivity.

High performance glass fibers possess higher strength and stiffness, compared to traditional E-glass fibers. In particular, for some products, stiffness is crucial for modeling and performance. For example, composites, such as wind turbine blades, prepared from glass fibers with good stiffness properties would allow for longer wind turbine blades on electrical generating wind stations while keeping flexure of the blade within acceptable limits.

Additionally, high-performance glass compositions are desired that possess favorable mechanical and physical properties (e.g., specific modulus and tensile strength), while maintain desirable forming properties (e.g., liquidus temperature and fiberizing temperature). Elastic modulus is a measure of the fiber stiffness, defining a relationship between the stress applied to a material and the strain produced by the same material. A stiff material has a high elastic modulus and changes its shape only slightly under elastic loads. A flexible material has a low elastic modulus and changes its shape considerably. Specific modulus is a measure of the elastic modulus per mass density of a fiberglass material. It can also be known as the stiffness to weight ratio and is often used to determine glass fibers with minimum weight, while not sacrificing stiffness.

SUMMARY OF THE INVENTION

Various exemplary embodiments of the present inventive concepts are directed to a glass composition comprising: $SiO_2$ in an amount from 58.0 to 68.0% by weight; $Al_2O_3$ in an amount from 18.0 to 23.0% by weight; CaO in an amount from 1.0 to 9.0% by weight; MgO in an amount from 9.0 to 14.0% by weight; $Na_2O$ in an amount from 0.0 to <1.0% by weight; $K_2O$ in an amount from 0.0 to 1.0% by weight; $Li_2O$ in an amount from 0.0 to 4.0% by weight; $TiO_2$ in an amount from 0.0 to 4.0% by weight; $Y_2O_3$ in an amount from 0 to 10.0% by weight; $La_2O_3$ in an amount from 0 to 10.0% by weight; $Ce_2O_3$ in an amount from 0 to 2.5% by weight; and $Sc_2O_3$ in an amount from 0 to 4.0% by weight.

In some exemplary embodiments, the glass composition has a ratio MgO/(CaO+SrO) of greater than 2.1.

In some exemplary embodiments, the glass fiber formed from the glass composition has specific modulus between 34 and 40 MJ/kg.

The glass composition may further include 0 to 5.0% by weight $Ta_2O_5$; 0 to 7.0% by weight $Ga_2O_3$; 0 to 5.0% by weight $Nb_2O_5$, and 0 to 5.0% by weight $V_2O_5$.

In various exemplary embodiments, the glass composition is essentially free of $B_2O_3$.

In various exemplary embodiments, the glass composition comprises 0.1 to 3.5% by weight $Li_2O$.

In various exemplary embodiments, the composition includes at least 1% by weight of a combined amount of one or more of $Y_2O_3$, $La_2O_3$, $Ce_2O_3$, and $Sc_2O_3$.

In various exemplary embodiments, the composition comprises less than 0.05% by weight of $Sm_2O_3+Gd_2O_3$.

Further exemplary aspects of the present inventive concepts are directed to a glass fiber formed from a composition comprising: $SiO_2$ in an amount from 55.0 to 68.0% by weight; $Al_2O_3$ in an amount from 18.0 to 23.0% by weight; CaO in an amount from 1.0 to 9.0% by weight; MgO in an amount from 9.0 to 14.0% by weight; $Na_2O$ in an amount from 0.0 to 1.0% by weight; $K_2O$ in an amount from 0.0 to 1.0% by weight; $Li_2O$ in an amount from greater than 1.0 to 4.0% by weight; $TiO_2$ in an amount from 0.0 to 4.0% by weight; $Y_2O_3$ in an amount from 0 to 10.0% by weight; $La_2O_3$ in an amount from 0 to 10.0% by weight; $Ce_2O_3$ in an amount from 0 to 2.5% by weight; and $Sc_2O_3$ in an amount from 0 to 4.0% by weight. The glass fiber has a specific modulus between 34 and 40 MJ/kg. The glass fiber further has a tensile strength according to ASTM D2343-09 of at least 4400 MPa.

In various exemplary embodiments, the composition comprises 1.5 to 3.5% by weight $Li_2O$.

In various exemplary embodiments, the composition comprises 1.0 to 5.0% by weight CaO.

In various exemplary embodiments, the composition includes at least 1% by weight of a combined amount of one or more of $Y_2O_3$, $La_2O_3$, $Ce_2O_3$, and $Sc_2O_3$.

Further exemplary embodiments are directed to a glass fiber that has a specific modulus of 35 to 36.5 MJ/kg.

Yet further exemplary aspects of the present inventive concepts are directed to a method of forming a continuous glass fiber comprising providing a molten glass composition; and drawing the molten composition through an orifice to form a continuous glass fiber.

Yet further exemplary aspects of the present inventive concepts are directed to a reinforced composite product comprising a polymer matrix; and a plurality of glass fibers formed from a glass composition comprising $SiO_2$ in an amount from 58.0 to 68.0% by weight; $Al_2O_3$ in an amount from 18.0 to 23.0% by weight; CaO in an amount from 1.0 to 9.0% by weight; MgO in an amount from 9.0 to 14.0% by weight; $Na_2O$ in an amount from 0.0 to 1.0% by weight; $K_2O$ in an amount from 0.0 to 1.0% by weight; $Li_2O$ in an amount from 0.0 to 4.0% by weight; $TiO_2$ in an amount from 0.0 to 4.0% by weight; $Y_2O_3$ in an amount from 0 to 10.0% by weight; $La_2O_3$ in an amount from 0 to 10.0% by weight; $Ce_2O_3$ in an amount from 0 to 2.5% by weight; and $Sc_2O_3$ in an amount from 0 to 4.0% by weight.

In various exemplary embodiments, the glass composition has a ratio MgO/(CaO+SrO) of greater than 2.1.

The glass fiber has a specific modulus between 34 and 40 MJ/kg.

In some exemplary embodiments, the reinforced composite product is in the form of a wind turbine blade.

The foregoing and other objects, features, and advantages of the invention will appear more fully hereinafter from a consideration of the detailed description that follows.

DETAILED DESCRIPTION

Unless otherwise defined, all technical and scientific terms used herein have the same meaning as commonly understood by one of ordinary skill in the art to which these exemplary embodiments belong. The terminology used in the description herein is for describing exemplary embodiments only and is not intended to be limiting of the exemplary embodiments. Accordingly, the general inventive concepts are not intended to be limited to the specific embodiments illustrated herein. Although other methods and materials similar or equivalent to those described herein can be used in the practice or testing of the present invention, the preferred methods and materials are described herein.

As used in the specification and the appended claims, the singular forms "a," "an," and "the" are intended to include the plural forms as well, unless the context clearly indicates otherwise.

Unless otherwise indicated, all numbers expressing quantities of ingredients, chemical and molecular properties, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present exemplary embodiments. At the very least each numerical parameter should be construed in light of the number of significant digits and ordinary rounding approaches.

Notwithstanding that the numerical ranges and parameters setting forth the broad scope of the exemplary embodiments are approximations, the numerical values set forth in the specific examples are reported as precisely as possible. Any numerical value, however, inherently contains certain errors necessarily resulting from the standard deviation found in their respective testing measurements. Every numerical range given throughout this specification and claims will include every narrower numerical range that falls within such broader numerical range, as if such narrower numerical ranges were all expressly written herein. Moreover, any numerical value reported in the Examples may be used to define either an upper or lower end-point of a broader compositional range disclosed herein.

The present disclosure relates to a high-performance glass composition with improved specific modulus. Such glass compositions are particularly interesting in the field of wind products, such as wind turbines that require longer blades in order to generate more energy. The longer blades require materials with higher specific modulus in order to withstand forces applied to them without breaking and without adding too much additional weight. The subject glass compositions include lithium and optionally rare earth oxides. Additionally, the subject glass compositions include higher levels of magnesium and alumina than other glass compositions in this space.

The glass compositions disclosed herein are suitable for melting in traditional commercially available refractory-lined glass furnaces, which are widely used in the manufacture of glass reinforcement fibers.

The glass composition may be in molten form, obtainable by melting the components of the glass composition in a melter. The glass composition exhibits a low fiberizing temperature, which is defined as the temperature that corresponds to a melt viscosity of about 1000 Poise, as determined by ASTM C965-96(2007). Lowering the fiberizing temperature may reduce the production cost of the glass fibers because it allows for a longer bushing life and reduced energy usage necessary for melting the components of a glass composition. Therefore, the energy expelled is generally less than the energy necessary to melt many commercially available glass formulations. Such lower energy requirements may also lower the overall manufacturing costs associated with the glass composition.

For example, at a lower fiberizing temperature, a bushing may operate at a cooler temperature and therefore does not "sag" as quickly as is typically seen. "Sag" is a phenomenon that occurs when a bushing that is held at an elevated temperature for extended periods of time loses its determined stability. Thus, by lowering the fiberizing temperature, the sag rate of the bushing may be reduced, and the bushing life can be maximized.

In some exemplary embodiments, the glass composition has a fiberizing temperature of less than 2,650° F., including fiberizing temperatures of no greater than 2,600° F., no greater than 2,550° F., no greater than 2,500° F., no greater than 2470° F., no greater than 2420° F., no greater than 2410° F., no greater than 2405° F., no greater than 2400° F., and no greater than 2390° F., and no greater than 2385° F. In some exemplary embodiments, the glass composition has a fiberizing temperature no greater than 2,300° F., such as no greater than 2,500° F., and no greater than 2,200° F.

Another fiberizing property of a glass composition is the liquidus temperature. The liquidus temperature is defined as the highest temperature at which equilibrium exists between liquid glass and its primary crystalline phase. The liquidus temperature, in some instances, may be measured by exposing the glass composition to a temperature gradient in a platinum-alloy boat for 16 hours (ASTM C829-81(2005)). At all temperatures above the liquidus temperature, the glass is completely molten, i.e., it is free from crystals. At temperatures below the liquidus temperature, crystals may form.

In some exemplary embodiments, the glass composition has a liquidus temperature below 2,600° F., including liquidus temperature of no greater than 2,400° F., no greater than 2,375° F., no greater than 2,350° F., no greater than 2,325° F., no greater than 2,305° F., no greater than 2,300° F., no greater than 2,290° F., no greater than 2,250° F., no greater than 2,225° F., and no greater than 2,215° F. In some exemplary embodiments, the glass composition has a liquidus temperature between 2,050° F. and 2,550° F., including between 2,150° F., and 2,490° F., between 2,190° F. and 2,450° F., and between 2,250° F. and 2,450° F.

A third fiberizing property is "ΔT", which is defined as the difference between the fiberizing temperature and the liquidus temperature. If the ΔT is too small, the molten glass may crystallize within the fiberizing apparatus and cause a break in the manufacturing process. Desirably, the ΔT is as large as possible for a given forming viscosity because it offers a greater degree of flexibility during fiberizing and helps to avoid devitrification both in the glass distribution system and in the fiberizing apparatus. A large ΔT additionally reduces the production cost of the glass fibers by allowing for a greater bushing life and a less sensitive forming process.

In some exemplary embodiments, the glass composition has a ΔT of at least −60° F., including at least −20° F., including at least 40° F., including at least 80° F., including at least 100° F., at least 110° F., at least 120° F., at least 135° F., at least 150° F., and at least 170° F. In various exemplary embodiments, the glass composition has a ΔT between 100° F. and 250° F., including between 120° F. and 200° F., and between 150° F. and 215° F.

The glass composition may include about 55.0 to about 68.0% by weight $SiO_2$, about 18.0 to about 23.0% by weight $Al_2O_3$, about 9.0 to about 14.0% by weight MgO, 0 to about 9.0% by weight CaO, 0.0 to about 1.0% by weight $Na_2O$, 0 to about 1.0% by weight $K_2O$, 0 to about 4.0% by weight $TiO_2$, 0 to about 0.8% by weight $Fe_2O_3$, and about 0.0 to about 4.0% by weight $Li_2O$. The glass composition may further include 0 to about 10.0% by weight $Y_2O_3$, 0 to about 10.0% by weight $La_2O_3$, 0 to about 2.5% by weight $Ce_2O_3$, and 0 to about 4.0% by weight $Sc_2O_3$. The glass composition may further include 0 to about 5.0% by weight $Ta_2O_5$, 0 to about 7.0% by weight $Ga_2O_3$, 0 to about 5.0% by weight $Nb_2O_5$, and 0 to about 5.0% by weight $V_2O_5$.

In some exemplary embodiments, the glass composition may include about 59.0 to about 65.0% by weight $SiO_2$, about 18.3 to about 22.0% by weight $Al_2O_3$, about 9.3 to about 12.0% by weight MgO, about 1.0 to about 8.5% by weight CaO, about 0.01 to about 0.5% by weight $Na_2O$, about 0.01 to about 0.5% by weight $K_2O$, about 0.01 to about 3.5% by weight $TiO_2$, about 0.01 to about 0.6% by weight $Fe_2O_3$, and about 0.1 to about 3.5% by weight $Li_2O$. In some embodiments, the glass composition is free of $ZrO_2$. The glass composition may further include about 0.01 to about 7.0% by weight $Y_2O_3$, about 0.01 to about 4.0% by weight $La_2O_3$, about 0.01 to about 2.0% by weight $Ce_2O_3$, and about 0.01 to about 3.5% by weight $Sc_2O_3$. The glass composition may further include about 0.01 to about 4.0% by weight $Ta_2O_5$, about 0.01 to about 6.0% by weight $Ga_2O_3$, about 0.01 to about 4.0% by weight $Nb_2O_5$, and about 0.01 to 4.0% by weight $V_2O_5$.

The glass composition includes at least 50% by weight and no greater than about 75% by weight $SiO_2$. In some exemplary embodiments, the glass composition includes at least about 55% by weight $SiO_2$, including at least 57% by weight, at least 58% by weight, at least 58.5% by weight, and at least 59% by weight. In some exemplary embodiments, the glass composition includes no greater than about 70% by weight $SiO_2$, including no greater than 68% by weight, no greater than 65.5% by weight, no greater than 63% by weight, no greater than 61% by weight, and no greater than 60.5% by weight. In some exemplary embodiments, the glass composition includes about 59% by weight to about 68% by weight, or about 60% by weight to about 65% by weight $SiO_2$.

To achieve both the desired mechanical and fiberizing properties, one important aspect of the glass composition is having a $Al_2O_3$ concentration of at least about 16.0% by weight and no greater than about 25% by weight. Including greater than about 25% by weight $Al_2O_3$ causes the glass liquidus to increase to a level above the fiberizing temperature, which results in a negative ΔT. Including less than 17% by weight $Al_2O_3$ forms a glass fiber with an unfavorably low modulus. In some exemplary embodiments, the glass composition includes at least about 17.0% by weight $Al_2O_3$, including at least 18.0% by weight, at least 19.0% by weight, at least 19.5% by weight, and at least 20.0% by weight. In some exemplary embodiments, the glass composition includes about 18.3 to about 23 wt. % $Al_2O_3$, including about 18.8 to about 22 wt. % $Al_2O_3$.

The glass composition further advantageously includes at least about 8.0% by weight and no greater than about 15% by weight MgO. Including greater than about 15% by weight MgO will cause the liquidus temperature to increase, which also increases the glass's crystallization tendency. Including less than about 8.0% by weight forms a glass fiber with an unfavorably low modulus if substituted by CaO and an unfavorable increase in viscosity if substituted with $SiO_2$. In some exemplary embodiments, the glass composition includes at least about 9.0% by weight MgO, including at least 9.2% by weight, at least 9.5% by weight, at least 10% by weight, at least 11% by weight, at least 11.25% by weight, at least 12.5% by weight, and at least 13% by weight MgO. In some exemplary embodiments, the glass composition comprises an MgO concentration between about 9.3 and about 14% by weight, or between about 9.6 and about 12% by weight.

The glass composition may optionally include CaO at concentrations up to about 10.0 wt. %. Including greater than about 10% by weight CaO forms a glass with a lower than desired elastic modulus. In some exemplary embodiments, the glass composition includes between 0 and about 9% by weight CaO, including between 0.5 and 8.8% by weight, between 1.0 and 8.5% by weight, between 1.5 and 8.0% by weight, and between 2.0 and 5.5% by weight. In some exemplary embodiments, the glass composition includes a CaO concentration between 1.0% by weight and 5.5% by weight.

In some exemplary embodiments, the total concentration of MgO and CaO is at least about 10% by weight and no greater than about 22% by weight, including between 12.0% by weight and 20% by weight, and between 14% by weight and 19.5% by weight.

The glass composition may include up to about 5.0% by weight $TiO_2$. In some exemplary embodiments, the glass composition includes 0% by weight to about 4.0% by weight $TiO_2$, including about 0.01% by weight to about 3.5% by weight and about 0.1 to about 0.75% by weight.

The glass composition may include up to about 1.0% by weight $Fe_2O_3$. In some exemplary embodiments, the glass composition includes 0% by weight to about 0.8% by weight $Fe_2O_3$, including about 0.01% by weight to about 0.6% by weight and about 0.1 to about 0.35% by weight.

The glass composition may include up to about 5.0% by weight $Li_2O$. In some exemplary embodiments, the glass composition includes about 0.0% by weight to about 4.0% by weight $Li_2O$, including about 0.1% by weight to about 3.5% by weight and about 0.5 to about 3.0% by weight. In some exemplary embodiments, the glass composition includes about 1.0 to about 4.0 wt. % $Li_2O$, or about 1.5 to about 3.8 wt. % $Li_2O$.

In some exemplary embodiments, the glass composition includes less than about 2.0% by weight of the alkali metal oxides $Na_2O$ and $K_2O$, including between 0 and about 1.5% by weight, between 0.05 and 0.75% by weight, and between 0.1 and 0.3% by weight. The glass composition may include both $Na_2O$ and $K_2O$ in an amount greater than about 0.01% by weight of each oxide. In some exemplary embodiments, the glass composition includes about 0 to about 1% by weight $Na_2O$, including about 0.01 to about 0.5% by weight, about 0.03 to about 0.3% by weight, and 0.04 to about 0.15% by weight. In some exemplary embodiments, the glass composition includes about 0 to about 1% by weight $K_2O$, including about 0.01 to about 0.5% by weight, about 0.03 to about 0.3% by weight, and 0.04 to about 0.15% by weight. In some exemplary embodiments, the glass composition includes less than 1.0% by weight $K_2O$, such as less than 0.75% by weight, or less than 0.50% by weight.

The glass composition may include up to about 1.5% by weight $ZrO_2$. In some exemplary embodiments, the glass composition includes about 0.01% by weight to about 1.0% by weight $ZrO_2$, including about 0.05% by weight to about 0.8% by weight and about 0.1 to about 0.5% by weight.

In some exemplary embodiments, the glass composition includes up to about 10.0% by weight of the rare earth oxides $Y_2O_3$, $La_2O_3$, $Ce_2O_3$, and $Sc_2O_3$ ("$R_2O_3$"), including between 0 and 10.0% by weight, or between 0.1 and 7.0% by weight. The glass composition may include any of the $R_2O_3$ oxides in an amount greater than about 0.01% by weight. In some exemplary embodiments, the glass composition includes about 0 to about 10% by weight $Y_2O_3$, including about 0.01 to about 7.0% by weight, about 0.05 to about 4.0% by weight, and 0.8 to about 3.5% by weight. In some exemplary embodiments, the glass composition includes about 0 to about 10% by weight $La_2O_3$, including about 0.01 to about 4.0% by weight, about 0.05 to about 3.5% by weight, and 0.1 to about 3.0% by weight. In some exemplary embodiments, the glass composition includes about 0 to about 2.5% by weight $Ce_2O_3$, including about 0.01 to about 2.0% by weight, about 0.05 to about 1.8% by weight, and 0.1 to about 1.5% by weight. In some exemplary embodiments, the glass composition includes about 0 to about 4% by weight $Sc_2O_3$, including about 0.01 to about 3.5% by weight, about 0.05 to about 3.2% by weight, and 0.1 to about 3.0% by weight.

In some exemplary embodiments, the glass composition includes a total concentration of $CeO_2+Sc_2O_3$ that is at least 1.0% by weight, including at least 1.5% by weight, at least 1.75% by weight, at least 2.0% by weight, at least 2.1% by weight, at least 2.2% by weight, and at least 2.5% by weight.

The glass composition may include up to about 5.0% by weight $Ta_2O_5$. In some exemplary embodiments, the glass composition includes about 0.01% by weight to about 4.0% by weight $Ta_2O_5$, including about 0.05% by weight to about 3.5% by weight and about 0.1 to about 3.0% by weight.

The glass composition may include up to about 7.0% by weight $Ga_2O_3$. In some exemplary embodiments, the glass composition includes about 0.01% by weight to about 6.0% by weight $Ga_2O_3$, including about 0.05% by weight to about 5.5% by weight and about 0.1 to about 5.0% by weight.

The glass composition may include up to about 5.0% by weight $Nb_2O_5$. In some exemplary embodiments, the glass composition includes about 0.01% by weight to about 4.0% by weight $Nb_2O_5$, including about 0.05% by weight to about 3.5% by weight and about 0.1 to about 3.0% by weight.

The glass composition may include up to about 5.0% by weight $V_2O_5$. In some exemplary embodiments, the glass composition includes about 0.01% by weight to about 4.0% by weight $V_2O_5$, including about 0.05% by weight to about 3.5% by weight and about 0.1 to about 3.0% by weight.

The glass compositions may include up to about 1.0% by weight of $Sm_2O_3$ and/or $Gd_2O_3$. However, various exemplary embodiments limit the total concentration of $Sm_2O_3$ and $Gd_2O_3$ to less than 0.5% by weight, including less than 0.1% by weight, and less than 0.05% by weight.

The glass composition may include up to about 5.0% by weight ZnO. In some exemplary embodiments, the glass composition includes 0% by weight to about 2.5% by weight ZnO, including about 0.01% by weight to about 2.0% by weight and about 0.1 to about 1.0% by weight.

The inventive glass compositions may be free or substantially free of $B_2O_3$ and fluorine, although any may be added in small amounts to adjust the fiberizing and finished glass properties and will not adversely impact the properties if maintained below several percent. As used herein, substantially free of $B_2O_3$ and fluorine means that the sum of the amounts of $B_2O_3$ and fluorine present is less than 1.0% by weight of the composition. The sum of the amounts of $B_2O_3$ and fluorine present may be less than about 0.5% by weight of the composition, including less than about 0.2% by weight, less than about 0.1% by weight, and less than about 0.05% by weight.

The glass compositions may further include impurities and/or trace materials without adversely affecting the glasses or the fibers. These impurities may enter the glass as raw material impurities or may be products formed by the chemical reaction of the molten glass with furnace components. Non-limiting examples of trace materials include strontium, barium, and combinations thereof. The trace materials may be present in their oxide forms and may further include fluorine and/or chlorine. In some exemplary embodiments, the inventive glass compositions contain no more than about 1.0% by weight, including less than 0.5% by weight, less than 0.2% by weight, and less than 0.1% by weight of each of BaO, SrO, $P_2O_5$, and $SO_3$. Particularly, the glass composition may include less than about 5.0% by weight of BaO, SrO, $P_2O_5$, and/or $SO_3$ combined, wherein each of BaO, SrO, $P_2O_5$, and $SO_3$ if present at all, is present in an amount of less than 1.0% by weight.

In some exemplary embodiments, the glass composition comprises a ratio of MgO/(CaO+SrO) that is at least 1.5, including at least 1.7, at least 2.0, at least 2.1, at least 2.2, and at least 2.3.

As used herein, the terms "weight percent," "% by weight," "wt. %," and "percent by weight" may be used interchangeably and are meant to denote the weight percent (or percent by weight) based on the total composition.

As indicated above, the inventive glass compositions unexpectedly demonstrate an optimized specific modulus, while maintaining desirable forming properties.

The fiber tensile strength is also referred herein simply as "strength." In some exemplary embodiments, the tensile strength is measured on pristine fibers (i.e., unsized and untouched laboratory produced fibers) using an Instron tensile testing apparatus according to ASTM D2343-09. Exemplary glass fibers formed form the above described inventive glass composition may have a fiber tensile strength of at least about 3,500 MPa, including at least 4,000 MPa, at least 4,400 MPa, at least 4,500 MPa, at least 4,800 MPa, at least 4,900 MPa, at least 4,950 MPa, at least 5,000 MPa, at least 5,100 MPa, at least 5,150 MPa, and at least 5,200 MPa. In some exemplary embodiments, the glass fibers formed from the above described composition have a fiber tensile strength of from about 3500 to about 5500 MPa, including about 4000 MPa to about 5,350 MPa, about 4,600 to about 5,315 MPa. Advantageously, the combination of compositional parameters disclosed herein makes it possible to produce glass fibers having tensile strengths of at least about 4,800 MPa, including at least 4,900 MPa, and at least 5,000, which has not yet been achieved by the prior art with a glass composition having desirable fiberizing properties.

The elastic modulus of a glass fiber may be determined by taking the average measurements on five single glass fibers measured in accordance with the sonic measurement procedure outlined in the report "Glass Fiber Drawing and Measuring Facilities at the U.S. Naval Ordnance Laboratory", Report Number NOLTR 65-87, Jun. 23, 1965.

The exemplary glass fibers formed from the inventive glass composition may have an elastic modulus of at least about 85 GPa, including at least about 88 GPa, at least about 88.5 GPa, at least about 89 GPa, and at least about 89.5 GPa. In some exemplary embodiments, the exemplary glass fibers formed from the inventive glass composition have an elastic modulus of between about 85 GPa and about 115 GPa, including between about 87 GPa and about 100 GPa, and between about 88 GPa and about 98 GPa.

The elastic modulus may then be used to determine the specific modulus. It is desirable to have a specific modulus as high as possible to achieve a lightweight composite material that adds stiffness to the final article. Specific modulus is important in applications where stiffness of the product is an important parameter, such as in wind energy and aerospace applications. As used herein, the specific modulus is calculated by the following equation:

Specific Modulus (MJ/kg)=Modulus (GPa)/Density (kg/cubic meter)

The exemplary glass fibers formed from the inventive glass composition has an optimized specific modulus of about 33.0 MJ/kg to about 40.0 MJ/kg, including about 34.5 MJ/kg to about 37 MJ/kg, and about 35.8 MJ/kg to about 36.5 MJ/kg.

The density may be measured by any method known and commonly accepted in the art, such as the Archimedes method (ASTM C693-93(2008)) on unannealed bulk glass. The glass fibers have a density of from about 2.0 to about 3.0 g/cc. In other exemplary embodiments, the glass fibers have a density of from about 2.3 to about 2.8 g/cc, including from about 2.4 to about 2.78 g/cc, and about 2.49 to about 2.75 g/cc.

According to some exemplary embodiments, a method is provided for preparing glass fibers from the glass composition described above. The glass fibers may be formed by any means known and traditionally used in the art. In some exemplary embodiments, the glass fibers are formed by obtaining raw ingredients and mixing the ingredients in the appropriate quantities to give the desired weight percentages of the final composition. The method may further include providing the inventive glass composition in molten form and drawing the molten composition through orifices in a bushing to form a glass fiber.

The components of the glass composition may be obtained from suitable ingredients or raw materials including, but not limited to, sand or pyrophyllite for $SiO_2$, limestone, burnt lime, wollastonite, or dolomite for CaO, kaolin, alumina or pyrophyllite for $Al_2O_3$, dolomite, dolomitic quicklime, brucite, enstatite, talc, burnt magnesite, or magnesite for MgO, and sodium carbonate, sodium feldspar or sodium sulfate for the $Na_2O$. In some exemplary embodiments, glass cullet may be used to supply one or more of the needed oxides.

The mixed batch may then be melted in a furnace or melter and the resulting molten glass is passed along a forehearth and drawn through the orifices of a bushing located at the bottom of the forehearth to form individual glass filaments. In some exemplary embodiments, the furnace or melter is a traditional refractory melter. By utilizing a refractory tank formed of refractory blocks, manufacturing costs associated with the production of glass fibers produced by the inventive composition may be reduced. In some exemplary embodiments, the bushing is a platinum alloy-based bushing. Strands of glass fibers may then be formed by gathering the individual filaments together. The fiber strands may be wound and further processed in a conventional manner suitable for the intended application.

The operating temperatures of the glass in the melter, forehearth, and bushing may be selected to appropriately adjust the viscosity of the glass, and may be maintained using suitable methods, such as control devices. The temperature at the front end of the melter may be automatically controlled to reduce or eliminate devitrification. The molten glass may then be pulled (drawn) through holes or orifices in the bottom or tip plate of the bushing to form glass fibers. In accordance with some exemplary embodiments, the streams of molten glass flowing through the bushing orifices are attenuated to filaments by winding a strand formed of a plurality of individual filaments on a forming tube mounted on a rotatable collet of a winding machine or chopped at an adaptive speed. The glass fibers of the invention are obtainable by any of the methods described herein, or any known method for forming glass fibers.

The fibers may be further processed in a conventional manner suitable for the intended application. For instance, in some exemplary embodiments, the glass fibers are sized with a sizing composition known to those of skill in the art. The sizing composition is in no way restricted, and may be any sizing composition suitable for application to glass fibers. The sized fibers may be used for reinforcing substrates such as a variety of plastics where the product's end use requires high strength and stiffness and low weight. Such applications include, but are not limited to, woven fabrics for use in forming wind turbine blades; infrastructure, such as reinforcing concrete, bridges, etc.; and aerospace structures.

In this regard, some exemplary embodiments of the present invention include a composite material incorporating the inventive glass fibers, as described above, in combination with a hardenable matrix material. This may also be referred to herein as a reinforced composite product. The matrix material may be any suitable thermoplastic or thermoset resin known to those of skill in the art, such as, but not limited to, thermoplastics such as polyesters, polypropylene, polyamide, polyethylene terephthalate, and polybutylene, and thermoset resins such as epoxy resins, unsaturated polyesters, phenolics, vinylesters, and elastomers. These resins may be used alone or in combination. The reinforced composite product may be used for wind turbine blade, rebar, pipe, filament winding, muffler filling, sound absorption, and the like.

In accordance with further exemplary embodiments, the invention provides a method of preparing a composite product as described above. The method may include combining at least one polymer matrix material with a plurality of glass fibers. Both the polymer matrix material and the glass fibers may be as described above.

EXAMPLES

Exemplary glass compositions according to the present invention were prepared by mixing batch components in proportioned amounts to achieve a final glass composition with the oxide weight percentages set forth in Tables 1-8, below.

The raw materials were melted in a platinum crucible in an electrically heated furnace at a temperature of 1,650° C. for 3 hours.

The fiberizing temperature was measured using a rotating cylinder method as described in ASTM C965-96(2007), entitled "Standard Practice for Measuring Viscosity of Glass Above the Softening Point," the contents of which are incorporated by reference herein. The liquidus temperature was measured by exposing glass to a temperature gradient in a platinum-alloy boat for 16 hours, as defined in ASTM C829-81(2005), entitled "Standard Practices for Measurement of Liquidus Temperature of Glass," the contents of which are incorporated by reference herein. Density was measured by the Archimedes method, as detailed in ASTM C693-93(2008), entitled "Standard Test Method for Density of Glass Buoyancy," the contents of which are incorporated by reference herein.

The specific modulus was calculated by dividing the measured modulus in units of GPa by the density in units of $kg/m^3$.

The strength was measured on pristine fibers using an Instron tensile testing apparatus according to ASTM D2343-09 entitled, "Standard Test Method for Tensile Properties of Glass Fiber Strands, Yarns, and Rovings Used in Reinforced Plastics," the contents of which are incorporated by reference herein.

TABLE 1

|  | Ex. 1 (% by wt.) | Ex. 2 (% by wt.) | Ex. 3 (% by wt.) | Ex. 4 (% by wt.) | Ex. 5 (% by wt.) | Ex. 6 (% by wt.) |
| --- | --- | --- | --- | --- | --- | --- |
| Component |  |  |  |  |  |  |
| $SiO_2$ | 60.00 | 64.00 | 65.00 | 64.50 | 63.00 | 63.50 |
| $Al_2O_3$ | 22.00 | 21.00 | 21.00 | 20.50 | 21.00 | 20.50 |
| MgO | 14.0 | 12.00 | 12.00 | 12.00 | 12.00 | 12.00 |
| CaO | 0.00 | 1.00 | 0.00 | 1.00 | 2.00 | 2.00 |
| $Li_2O$ | 4.00 | 2.00 | 2.00 | 2.00 | 2.00 | 2.00 |
| $Fe_2O_3$ | 0.00 | 0.00 | 0.00 | 0.00 | 0.00 | 0.00 |
| $K_2O$ | 0.00 | 0.00 | 0.00 | 0.00 | 0.00 | 0.00 |
| $Na_2O$ | 0.00 | 0.00 | 0.00 | 0.00 | 0.00 | 0.00 |
| $TiO_2$ | 0.00 | 0.00 | 0.0 | 0.00 | 0.00 | 0.00 |
| Property |  |  |  |  |  |  |
| Fiberizing Temperature (° F.) | 2258 | 2481 | 2520 | 2510 | 2459 | 2456 |
| Liquidus Temperature (° F.) | 2262 | 2267 | 2434 | 2381 | 2341 | 2330 |
| ΔT (° F.) | −4 | 115 | 86 | 123 | 119 | 126 |
| Density (g/cc) | 2.540 | 2.517 | 2.495 | 2.522 | 2.529 | 2.564 |
| Elastic Modulus (GPa) | 92.4 | 91.4 | 90.5 | 91.4 | 91.6 | 92.0 |
| Specific Modulus (MJ/kg) | 36.40 | 36.30 | 36.3 | 36.3 | 36.2 | 36.1 |
| Strength (MPa) | 4936 | 5132 | 4923 | 5315 | 5224 | 5186 |

TABLE 2

|  | Ex. 7 (% by wt.) | Ex. 8 (% by wt.) | Example 9 (% by wt.) | Example 10 (% by wt.) | Example 11 (% by wt.) |
| --- | --- | --- | --- | --- | --- |
| Component |  |  |  |  |  |
| $SiO_2$ | 62.00 | 59.00 | 62.4 | 62.50 | 65.50 |
| $Al_2O_3$ | 21.00 | 22.0 | 20.30 | 20.50 | 20.50 |

TABLE 2-continued

|  | Ex. 7 (% by wt.) | Ex. 8 (% by wt.) | Example 9 (% by wt.) | Example 10 (% by wt.) | Example 11 (% by wt.) |
|---|---|---|---|---|---|
| MgO | 12.00 | 12.00 | 12.00 | 12.00 | 12.00 |
| CaO | 3.00 | 3.00 | 3.30 | 3.00 | 0.00 |
| $Li_2O$ | 2.00 | 2.00 | 2.00 | 2.00 | 2.00 |
| $Fe_2O_3$ | 0.00 | 0.00 | 0.00 | 0.00 | 0.00 |
| $K_2O$ | 0.00 | 0.00 | 0.00 | 0.00 | 0.00 |
| $Na_2O$ | 0.00 | 0.00 | 0.00 | 0.00 | 0.00 |
| $TiO_2$ | 0.00 | 2.00 | 0.00 | 0.00 | 0.00 |
| Property |  |  |  |  |  |
| Fiberizing Temperature (° F.) | 2420 | 2321 | 2388 | 2398 | 2499 |
| Liquidus Temperature (° F.) | 2310 | 2316 | 2268 | 2281 | 2407 |
| ΔT (° F.) | 111 | 6 | 121 | 117 | 93 |
| Density (g/cc) | 2.545 | 2.571 | 2.540 | 2.543 | 2.494 |
| Elastic Modulus (GPa) | 91.9 | 92.8 | 91.6 | 91.6 | 89.7 |
| Specific Modulus (MJ/kg) | 36.1 | 36.1 | 36.0 | 36.0 | 36.0 |
| Strength (MPa) | 5234 | 5035 | 5026 | 5197 | 5018 |

TABLE 3

|  | Example 12 (% by wt.) | Example 13 (% by wt.) | Example 14 (% by wt.) | Example 15 (% by wt.) | Example 16 (% by wt.) |
|---|---|---|---|---|---|
| Component |  |  |  |  |  |
| $SiO_2$ | 59.95 | 60.00 | 61.20 | 60.50 | 61.00 |
| $Al_2O_3$ | 19.45 | 20.5 | 19.85 | 20.50 | 20.50 |
| MgO | 11.15 | 12.00 | 9.82 | 12.00 | 12.00 |
| CaO | 5.13 | 1.50 | 5.23 | 1.50 | 2.50 |
| $Li_2O$ | 1.85 | 2.00 | 1.89 | 2.00 | 2.00 |
| $Fe_2O_3$ | 0.00 | 0.00 | 0.00 | 0.00 | 0.00 |
| $K_2O$ | 0.00 | 0.00 | 0.00 | 0.00 | 0.00 |
| $Na_2O$ | 0.00 | 0.00 | 0.00 | 0.00 | 0.00 |
| $TiO_2$ | 0.00 | 0.00 | 0.00 | 0.00 | 0.00 |
| $Sc_2O_3$ | 4.00 | 0.00 | 2.00 | 0.00 | 0.00 |
| $Y_2O_3$ | 0.00 | 3.00 | 0.00 | 3.50 | 0.00 |
| $ZrO_2$ | 0.00 | 1.00 | 0.00 | 0.00 | 0.00 |
| $Nb_2O_5$ | 0.00 | 0.00 | 0.00 | 0.00 | 2.00 |
| $La_2O_3$ | 0.00 | 0.00 | 0.00 | 0.00 | 0.00 |
| $Ga_2O_3$ | 0.00 | 0.00 | 0.00 | 0.00 | 0.00 |
| Property |  |  |  |  |  |
| Fiberizing Temperature (° F.) | 2350 | 2355 | 2381 | 2367 | 2356 |
| Liquidus Temperature (° F.) | 2405 | 2310 | 2235 | 2308 | 2317 |
| ΔT (° F.) | 176 | 45 | 146 | 59 | 40 |
| Density (g/cc) | 2.602 | 2.600 | 2.577 | 2.593 | 2.558 |
| Elastic Modulus (GPa) | 93.5 | 93.1 | 92.2 | 92.8 | 91.3 |
| Specific Modulus (MJ/kg) | 35.9 | 35.8 | 35.8 | 35.8 | 35.7 |
| Strength (MPa) | 4818 | 4984 | 5056 | 5058 | — |

TABLE 4

| Component | Example 17 (% by wt.) | Example 18 (% by wt.) | Example 19 (% by wt.) | Example 20 (% by wt.) | Example 21 (% by wt.) |
|---|---|---|---|---|---|
| $SiO_2$ | 50.89 | 61.00 | 61.00 | 60.0 | 61.83 |
| $Al_2O_3$ | 22.92 | 20.5 | 20.5 | 20.0 | 20.06 |
| MgO | 12.46 | 12.0 | 12.00 | 12.00 | 9.92 |
| CaO | 4.47 | 2.50 | 2.50 | 2.00 | 5.29 |
| $Li_2O$ | 2.20 | 2.00 | 2.00 | 2.00 | 1.91 |
| $Fe_2O_3$ | 0.01 | 0.00 | 0.00 | 0.00 | 0.00 |
| $K_2O$ | 0.01 | 0.00 | 0.00 | 0.00 | 0.00 |
| $Na_2O$ | 0.03 | 0.00 | 0.00 | 0.00 | 0.00 |
| $TiO_2$ | 0.01 | 0.00 | 0.00 | 0.00 | 0.00 |
| $Sc_2O_3$ | 0.00 | 0.00 | 0.00 | 0.00 | 0.00 |
| $Y_2O_3$ | 5.49 | 0.00 | 0.00 | 0.00 | 0.00 |
| $ZrO_2$ | 0.00 | 0.00 | 0.00 | 1.00 | 1.00 |
| $Nb_2O_5$ | 0.00 | 0.00 | 0.00 | 0.00 | 0.00 |
| $La_2O_3$ | 1.50 | 0.00 | 0.00 | 0.00 | 0.00 |
| $Ga_2O_3$ | 0.00 | 2.00 | 0.00 | 0.00 | 0.00 |
| $Ta_2O_5$ | 0.00 | 0.00 | 2.00 | 0.00 | 0.00 |
| $V_2O_5$ | 0.00 | 0.00 | 0.00 | 0.00 | 0.00 |
| Property | | | | | |
| Fiberizing Temperature (° F.) | 2193 | 2375 | 2380 | 2371 | 2443 |
| Liquidus Temperature (° F.) | 2217 | 2299 | 2287 | 2321 | 2230 |
| ΔT (° F.) | −24 | 77 | 94 | 50 | 213 |
| Density (g/cc) | 2.744 | 2.562 | 2.571 | 2.596 | 2.559 |
| Elastic Modulus (GPa) | 98.0 | 91.3 | 91.6 | 92.3 | 92.3 |
| Specific Modulus (MJ/kg) | 35.7 | 35.6 | 35.6 | 35.5 | 35.5 |
| Strength (MPa) | — | — | — | — | 5016 |

TABLE 5

| Component | Example 22 (% by wt.) | Example 23 (% by wt.) | Example 24 (% by wt.) | Example 25 (% by wt.) | Example 26 (% by wt.) |
|---|---|---|---|---|---|
| $SiO_2$ | 58.00 | 61.00 | 63.50 | 64.00 | 60.00 |
| $Al_2O_3$ | 20.00 | 20.50 | 20.50 | 21.00 | 20.50 |
| MgO | 12.00 | 12.00 | 11.70 | 11.70 | 12.00 |
| CaO | 2.00 | 2.50 | 4.00 | 3.00 | 1.50 |
| $Li_2O$ | 2.00 | 2.00 | 0.00 | 0.00 | 2.00 |
| $Fe_2O_3$ | 0.00 | 0.00 | 0.00 | 0.00 | 0.00 |
| $K_2O$ | 0.00 | 0.00 | 0.00 | 0.00 | 0.00 |
| $Na_2O$ | 0.00 | 0.00 | 0.30 | 0.30 | 0.00 |
| $TiO_2$ | 0.00 | 0.00 | 0.00 | 0.00 | 0.00 |
| $Sc_2O_3$ | 0.00 | 0.00 | 0.00 | 0.00 | 0.00 |
| $Y_2O_3$ | 4.00 | 0.00 | 0.00 | 0.00 | 0.00 |
| $ZrO_2$ | 0.00 | 0.00 | 0.00 | 0.00 | 1.00 |
| $Nb_2O_5$ | 0.00 | 0.00 | 0.00 | 0.00 | 0.00 |
| $La_2O_3$ | 3.00 | 0.00 | 0.00 | 0.00 | 3.00 |
| $Ga_2O_3$ | 0.00 | 2.00 | 0.00 | 0.00 | 0.00 |
| $Ta_2O_5$ | 3.00 | 0.00 | 2.00 | 0.00 | 0.00 |
| $V_2O_5$ | 0.00 | 2.00 | 0.00 | 0.00 | 0.00 |
| Property | | | | | |
| Fiberizing Temperature (° F.) | 2326 | 2360 | 2545 | 2573 | 2360 |
| Liquidus Temperature (° F.) | 2248 | 2311 | 2454 | 2490 | 2289 |

TABLE 5-continued

| | Example 22 (% by wt.) | Example 23 (% by wt.) | Example 24 (% by wt.) | Example 25 (% by wt.) | Example 26 (% by wt.) |
|---|---|---|---|---|---|
| ΔT (° F.) | 79 | 49 | 92 | 84 | 71 |
| Density (g/cc) | 2.656 | 2.540 | 2.536 | 2.520 | 2.597 |
| Elastic Modulus (GPa) | 94.3 | 90.2 | 89.7 | 89.1 | 91.8 |
| Specific Modulus (MJ/kg) | 35.5 | 35.5 | 35.4 | 35.4 | 35.4 |
| Strength (MPa) | 4919 | — | — | — | 4953 |

TABLE 6

| | Example 27 (% by wt.) | Example 28 (% by wt.) | Example 29 (% by wt.) | Example 30 (% by wt.) | Example 31 (% by wt.) |
|---|---|---|---|---|---|
| Component | | | | | |
| $SiO_2$ | 61.00 | 61.00 | 58.00 | 60.50 | 61.00 |
| $Al_2O_3$ | 20.00 | 20.00 | 20.00 | 20.50 | 20.00 |
| MgO | 11.50 | 11.50 | 12.00 | 12.00 | 11.50 |
| CaO | 2.00 | 2.00 | 2.00 | 1.50 | 2.00 |
| $Li_2O$ | 1.50 | 1.50 | 2.00 | 2.00 | 1.50 |
| $Fe_2O_3$ | 0.00 | 0.00 | 0.00 | 0.00 | 0.00 |
| $K_2O$ | 0.00 | 0.00 | 0.00 | 0.00 | 0.00 |
| $Na_2O$ | 0.00 | 0.00 | 0.00 | 0.00 | 0.00 |
| $TiO_2$ | 0.00 | 0.00 | 0.00 | 0.00 | 0.00 |
| $Sc_2O_3$ | 0.00 | 0.00 | 0.00 | 0.00 | 0.00 |
| $Y_2O_3$ | 0.00 | 0.00 | 3.00 | 0.00 | 0.00 |
| $ZrO_2$ | 0.00 | 0.00 | 0.00 | 0.00 | 0.00 |
| $Nb_2O_5$ | 4.00 | 0.00 | 0.00 | 0.00 | 0.00 |
| $La_2O_3$ | 3.00 | 0.00 | 0.00 | 0.00 | 0.00 |
| $Ga_2O_3$ | 0.00 | 4.00 | 0.00 | 0.00 | 0.00 |
| $Ta_2O_5$ | 3.00 | 0.00 | 3.00 | 0.00 | 4.00 |
| $V_2O_5$ | 0.00 | 2.00 | 0.00 | 0.00 | 0.00 |
| Property | | | | | |
| Fiberizing Temperature (° F.) | 2404 | 2423 | 2319 | 2367 | 2380 |
| Liquidus Temperature (° F.) | 2264 | 2376 | 2256 | 2310 | 2374 |
| ΔT (° F.) | 41 | 48 | 63 | 57 | 7 |
| Density (g/cc) | 2.570 | 2.577 | 2.651 | 2.597 | 2.593 |
| Elastic Modulus (GPa) | 90.9 | 91.9 | 93.7 | 91.7 | 91.5 |
| Specific Modulus (MJ/kg) | 35.4 | 35.3 | 35.3 | 35.3 | 35.3 |
| Strength (MPa) | — | — | 4929 | 4959 | — |

TABLE 7

| | Example 32 (% by wt.) | Example 33 (% by wt.) | Example 34 (% by wt.) | Example 35 (% by wt.) | Example 36 (% by wt.) |
|---|---|---|---|---|---|
| Component | | | | | |
| $SiO_2$ | 60.26 | 57.33 | 61.20 | 61.20 | 58.00 |
| $Al_2O_3$ | 19.55 | 19.61 | 19.85 | 19.85 | 20.00 |
| MgO | 9.67 | 10.94 | 9.82 | 9.82 | 11 |

TABLE 7-continued

|  | Example 32 (% by wt.) | Example 33 (% by wt.) | Example 34 (% by wt.) | Example 35 (% by wt.) | Example 36 (% by wt.) |
| --- | --- | --- | --- | --- | --- |
| CaO | 5.15 | 8.83 | 5.23 | 5.23 | 3.00 |
| $Li_2O$ | 1.87 | 2.00 | 1.89 | 1.89 | 2.00 |
| $Fe_2O_3$ | 0.00 | 0.34 | 0.00 | 0.00 | 0.00 |
| $K_2O$ | 0.00 | 0.13 | 0.00 | 0.00 | 0.00 |
| $Na_2O$ | 0.00 | 0.12 | 0.00 | 0.00 | 0.00 |
| $TiO_2$ | 0.00 | 0.68 | 2.00 | 0.00 | 0.00 |
| $CeO_2$ | 0.00 | 0.00 | 0.00 | 2.00 | 0.00 |
| $Sc_2O_3$ | 0.00 | 0.00 | 0.00 | 0.00 | 0.00 |
| $Y_2O_3$ | 3.50 | 0.00 | 0.00 | 0.00 | 3.00 |
| $ZrO_2$ | 0.00 | 0.00 | 0.00 | 0.00 | 1.00 |
| $Nb_2O_5$ | 0.00 | 0.00 | 0.00 | 0.00 | 0.00 |
| $La_2O_3$ | 0.00 | 0.00 | 0.00 | 0.00 | 2.00 |
| $Ga_2O_3$ | 0.00 | 0.00 | 0.00 | 0.00 | 0.00 |
| $Ta_2O_5$ | 0.00 | 0.00 | 0.00 | 0.00 | 0.00 |
| $V_2O_5$ | 0.00 | 0.00 | 0.00 | 0.00 | 0.00 |
| Property |  |  |  |  |  |
| Fiberizing Temperature (° F.) | 2378 | 2236 | 2359 | 2391 | 2323 |
| Liquidus Temperature (° F.) | 2191 | 2190 | 2330 | 2242 | 2222 |
| ΔT (° F.) | 188 | 47 | 30 | 149 | 101 |
| Density (g/cc) | 2.607 | 2.620 | 2.565 | 2.580 | 2.649 |
| Elastic Modulus (GPa) | 92.0 | 92.4 | 90.4 | 90.6 | 93.0 |
| Specific Modulus (MJ/kg) | 35.3 | 35.3 | 35.2 | 35.1 | 35.1 |
| Strength (MPa) | 4927 | — | 4898 | 5021 | — |

TABLE 8

| Component | Example 37 (% by wt.) | Example 38 (% by wt.) | Example 39 (% by wt.) | Example 40 (% by wt.) | Example 41 (% by wt.) | Comparative Example |
| --- | --- | --- | --- | --- | --- | --- |
| $SiO_2$ | 59.95 | 61.00 | 55.50 | 58.08 | 59.50 | 60.70 |
| $Al_2O_3$ | 19.45 | 20.00 | 21 | 18.84 | 20.00 | 15.80 |
| MgO | 9.62 | 11.50 | 11.00 | 9.32 | 11.00 | 8.00 |
| CaO | 5.13 | 2.00 | 3.50 | 4.97 | 2.00 | 13.40 |
| $Li_2O$ | 1.85 | 1.50 | 2.00 | 1.79 | 1.50 | 0.75 |
| $Fe_2O_3$ | 0.00 | 0.00 | 0.00 | 0.00 | 0.00 | 0.27 |
| $K_2O$ | 0.00 | 0.00 | 0.00 | 0.00 | 0.00 | 0.10 |
| $Na_2O$ | 0.00 | 0.00 | 0.00 | 0.00 | 0.00 | 0.23 |
| $TiO_2$ | 4.00 | 0.00 | 0.00 | 0.00 | 0.00 | 0.48 |
| $Sc_2O_3$ | 0.00 | 0.00 | 0.00 | 0.00 | 0.00 | — |
| $Y_2O_3$ | 0.00 | 0.00 | 4.00 | 7.00 | 0.00 | — |
| $ZrO_2$ | 0.00 | 0.00 | 0.00 | 0.00 | 0.00 | — |
| $Nb_2O_5$ | 0.00 | 0.00 | 0.00 | 0.00 | 0.00 | — |
| $La_2O_3$ | 0.00 | 0.00 | 3.00 | 0.00 | 0.00 | — |
| $Ga_2O_3$ | 0.00 | 2.00 | 0.00 | 0.00 | 6.00 | — |
| $Ta_2O_5$ | 0.00 | 0.00 | 0.00 | 0.00 | 0.00 | — |
| $V_2O_5$ | 0.00 | 4.00 | 0.00 | 0.00 | 0.00 | — |
| Property |  |  |  |  |  | — |
| Fiberizing Temperature (° F.) | 2350 | 2392 | 2277 | 2338 | 2403 | 2324 |
| Liquidus Temperature (° F.) | 2241 | 2346 | 2293 | 2130 | 2380 | 2140 |
| ΔT (° F.) | 110 | 47 | −16 | 208 | 28 | 184 |
| Density (g/cc) | 2.581 | 2.533 | 2.690 | 2.673 | 2.605 | 2.614 |
| Elastic Modulus (GPa) | 90.6 | 88.9 | 94.1 | 93.5 | 91.0 | 87.5 |
| Specific Modulus (MJ/kg) | 35.1 | 35.1 | 35.0 | 35.0 | 35.0 | 33.5 |
| Strength (MPa) | 4719 | — | — | 4830 | — | 4637 |

Tables 1-8 illustrate the improvement in specific modulus that the inventive glass compositions have over commercial high-performance glass (Comparative Example). The Comparative Example demonstrates a specific modulus of 33.5 MJ/kg, which is below the minimum specific modulus seen from any of the inventive compositions. Instructively, each of the inventive compositions demonstrate a specific modulus of at least 34 MJ/kg, and more specifically at least 35 MJ/kg.

The invention of this application has been described above both generically and with regard to specific embodiments. Although the invention has been set forth in what is believed to be the preferred embodiments, a wide variety of alternatives known to those of skill in the art can be selected within the generic disclosure. The invention is not otherwise limited, except for the recitation of the claims set forth below.

The invention claimed is:

1. A glass composition comprising:
   $SiO_2$ in an amount from 50.0 to 55.5% by weight;
   $Al_2O_3$ in an amount from 19.5 to 23.0% by weight;
   CaO in an amount from 2.0 to 9.0% by weight;
   MgO in an amount from 9.0 to 14.0% by weight;
   SrO in an amount from 0.0 to 1.0% by weight;
   $Na_2O$ in an amount from 0.0 to 1.0% by weight;
   $K_2O$ in an amount from 0.0 to <1.0% by weight;
   $Li_2O$ in an amount from 1.0 to 4.0% by weight;
   $TiO_2$ in an amount from 0.0 to 4.0% by weight;
   $Y_2O_3$ in an amount from 0 to 10.0% by weight;
   $La_2O_3$ in an amount from 0 to 10.0% by weight;
   $Ce_2O_3$ in an amount from 0 to 2.5% by weight; and
   $Sc_2O_3$ in an amount from 0 to 4.0% by weight, wherein the glass composition has a ratio MgO/(CaO+SrO) of greater than 2.1, and a glass fiber formed from said glass composition has specific modulus between 34.0 and 40.0 MJ/kg and a fiberizing temperature no greater than 2,277° F.

2. The glass composition of claim 1, further including:
   0 to about 5.0% by weight $Ta_2O_5$;
   0 to about 7.0% by weight $Ga_2O_3$;
   0 to about 5.0% by weight $Nb_2O_5$, and
   0 to about 5.0% by weight $V_2O_5$.

3. The glass composition of claim 2, wherein said composition includes 1.0 to 3.5% by weight $Y_2O_3$.

4. The glass composition according to claim 1, wherein the combined amounts of MgO and CaO is between 12.0 and 20% by weight.

5. The glass composition according to claim 1, wherein said composition comprises 19.5 to 22.0% by weight $Al_2O_3$.

6. The glass composition according to claim 1, wherein said composition is essentially free of one or more of $B_2O_3$, F, $K_2O$, and $Na_2O$.

7. The glass composition according to claim 1, wherein said composition comprises 0.1 to 3.5% by weight $Li_2O$.

8. The glass composition according to claim 1, wherein said composition comprises less than 0.05% by weight of $Sm_2O_3+Gd_2O_3$.

9. The glass composition according to claim 1, wherein the composition includes at least 1% by weight of a combined amount of $Y_2O_3$, $La_2O_3$, $Ce_2O_3$, and $Sc_2O_3$.

10. A glass fiber formed from a composition comprising:
    $SiO_2$ in an amount from 50.0 to 55.5% by weight;
    $Al_2O_3$ in an amount from 19.5 to 23.0% by weight;
    CaO in an amount from 2.0 to 5.5% by weight;
    MgO in an amount from 9.0 to 14.0% by weight;
    $Na_2O$ in an amount from 0.0 to 1.0% by weight;
    $K_2O$ in an amount from 0.0 to 1.0% by weight;
    $Li_2O$ in an amount from greater than 1.0 to 4.0% by weight;
    $TiO_2$ in an amount from 0.0 to 4.0% by weight;
    $Y_2O_3$ in an amount from 3.0 to 10.0% by weight;
    $La_2O_3$ in an amount from 0 to 10.0% by weight;
    $Ce_2O_3$ in an amount from 0 to 2.5% by weight; and
    $Sc_2O_3$ in an amount from 0 to 4.0% by weight, wherein the glass fiber has specific modulus between 34.0 and 40.0 MJ/kg, a tensile strength according to ASTM D2343-09 of at least 4400 MPa, and a fiberizing temperature no greater than 2,277° F.

11. The glass fiber according to claim 10, wherein the glass composition comprises 1.0 to 5.0% by weight CaO.

12. The glass fiber according to claim 10, wherein said composition is essentially free of one or more of $B_2O_3$, F, $K_2O$, and $Na_2O$.

13. The glass fiber according to claim 10, wherein said composition comprises 1.5 to 3.5% by weight $Li_2O$.

14. The glass fiber according to claim 10, wherein the composition includes at least 1% by weight of a combined amount of $Y_2O_3$, $La_2O_3$, $Ce_2O_3$, and $Sc_2O_3$.

15. The glass fiber according to claim 10, wherein the composition includes greater than 2.0 wt. % $CeO_2+Sc_2O_3$.

16. A glass fiber according to claim 10, wherein said glass fiber has a specific modulus of 35 to 36.5 MJ/kg.

17. A method of forming a continuous glass fiber comprising:
    providing a molten composition according to claim 1; and
    drawing said molten composition through an orifice to form a continuous glass fiber.

18. A reinforced composite product comprising;
    a polymer matrix; and
    a plurality of glass fibers formed from a glass composition comprising:
    $SiO_2$ in an amount from 50.0 to 55.5% by weight;
    $Al_2O_3$ in an amount from 19.5 to 23.0% by weight;
    CaO in an amount from 2.0 to 5.5% by weight;
    MgO in an amount from 9.0 to 14.0% by weight;
    SrO in an amount from 0.0 to 1.0% by weight;
    $Na_2O$ in an amount from 0.0 to 1.0% by weight;
    $K_2O$ in an amount from 0.0 to <1.0% by weight;
    $Li_2O$ in an amount from 0.0 to 4.0% by weight;
    $TiO_2$ in an amount from 0.0 to 4.0% by weight;
    $Y_2O_3$ in an amount from 3.0 to 10.0% by weight;
    $La_2O_3$ in an amount from 0 to 10.0% by weight;
    $Ce_2O_3$ in an amount from 0 to 2.5% by weight; and
    $Sc_2O_3$ in an amount from 0 to 4.0% by weight, wherein the glass composition has a ratio MgO/(CaO+SrO) of greater than 2.1, and the glass fibers have specific modulus between 34.0 and 40.0 MJ/kg and a fiberizing temperature no greater than 2,277° F.

19. A reinforced composite product according to claim 18, wherein said reinforced composite product is in the form of a wind turbine blade.

* * * * *